March 5, 1963  R. C. GIESSE  3,080,064
FILTER SCRAPER

Filed Aug. 14, 1959  4 Sheets-Sheet 1

INVENTOR
ROBERT C. GIESSE
BY
Pollard Johnston Smythe & Robertson
ATTORNEYS

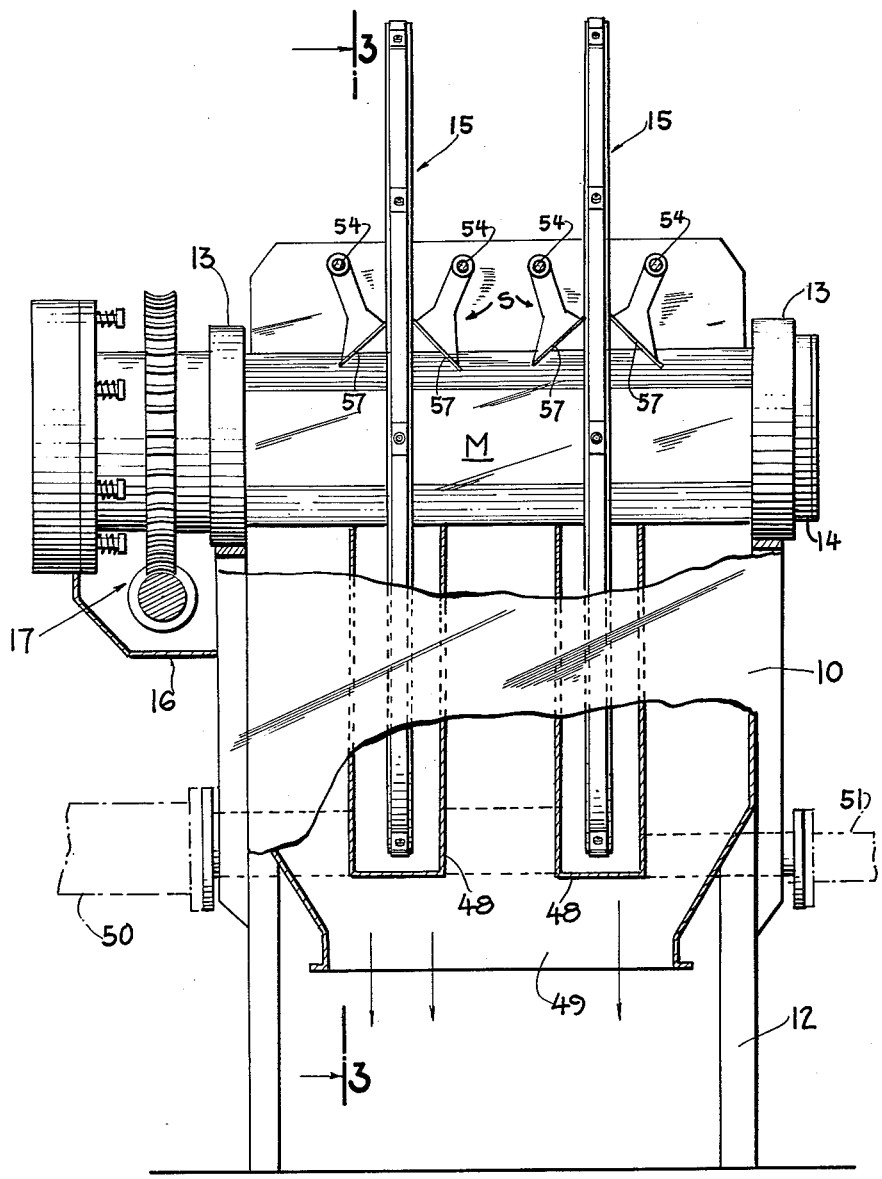

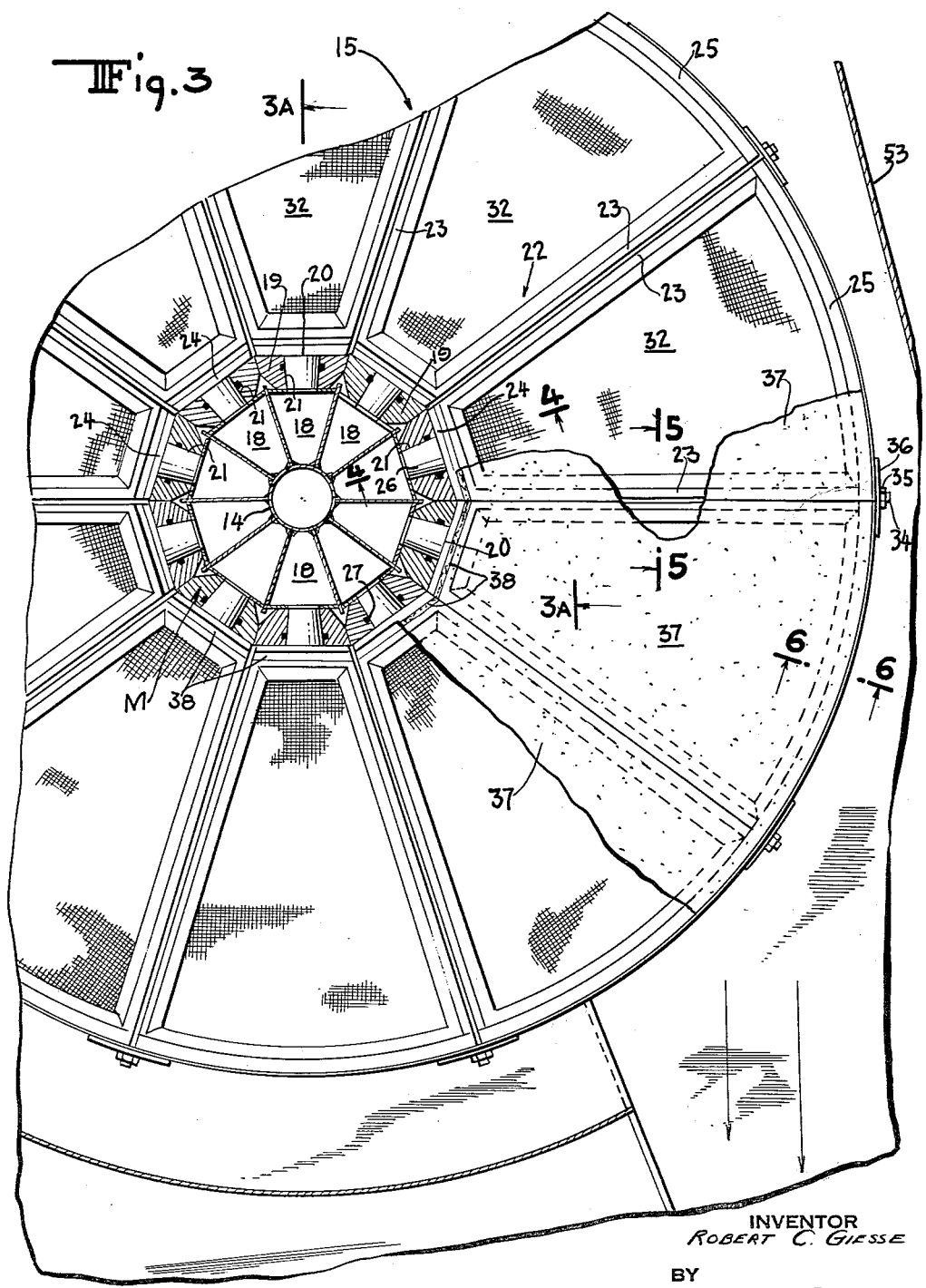

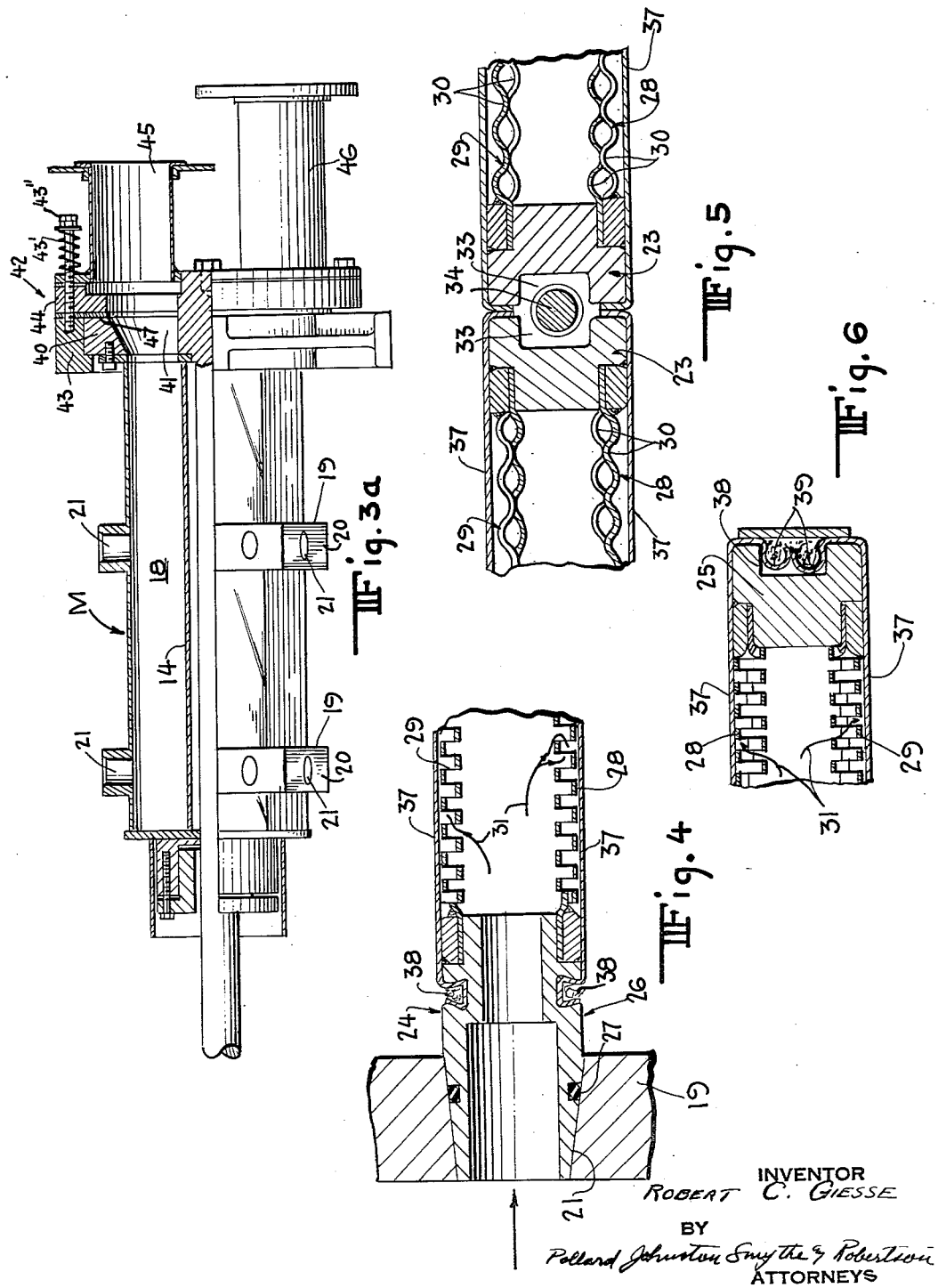

United States Patent Office 3,080,064
Patented Mar. 5, 1963

3,080,064
FILTER SCRAPER
Robert C. Giesse, Bettendorf, Iowa, assignor to Ametek, Inc., a corporation of Delaware
Filed Aug. 14, 1959, Ser. No. 833,762
2 Claims. (Cl. 210—396)

The present invention relates to disk filters and particularly to improvements in the construction of the means for removing the cake therefrom.

Vacuum or pressure disk filters normally include disks composed of individual segmental, bag-like compartments mounted about the periphery of a rotatable manifold that successively subjects each compartment to a vacuum or suitable pressure while it passes through the slurry being treated and to a slight positive or appropriate pressure as the compartment travels above the slurry.

A difficulty experienced with prior known filters is the tendency of the scraper blades for removing the cake from the exterior of the bags to dig into the cake often causing tearing of the cloth forming the filter bag.

The principal object of this invention is to provide a vacuum disk filter of the above-referred-to type in which the above difficulty is overcome.

Another object of this invention is to provide such a filter in which torque responsive cake scraping means is provided that automatically prevents the scraper blade from digging into the cake during the removal of the same from the filter disks.

In another aspect of the invention, pivotally mounted, suspended scraper blades may be located on at least one side of each disk and they may include adjustable torsion responsive means tending to maintain them in a predetermined position relatively to the sides of the disk, the suspension being such that the scraper will move away from the surface of the disk and in direction of movement of the adjacent surface thereof.

The above, other objects and novel features of the invention will become apparent from the following specification and accompanying drawings which are merely exemplary.

In the drawings:

FIG. 2 is a side elevational view of the filter shown in FIG. 1;

FIG. 3 is a sectional elevational view taken substantially along line 3—3 of FIG. 2;

FIG. 3A is a sectional view taken substantially along line 3A—3A of FIG. 3;

FIG. 4 is a detail sectional view taken substantially along line 4—4 of FIG. 3;

FIG. 5 is a detail sectional view taken substantially along line 5—5 of FIG. 3; and FIG. 6 is a detail sectional view taken substantially along line 6—6 of FIG. 3.

Figure 1:
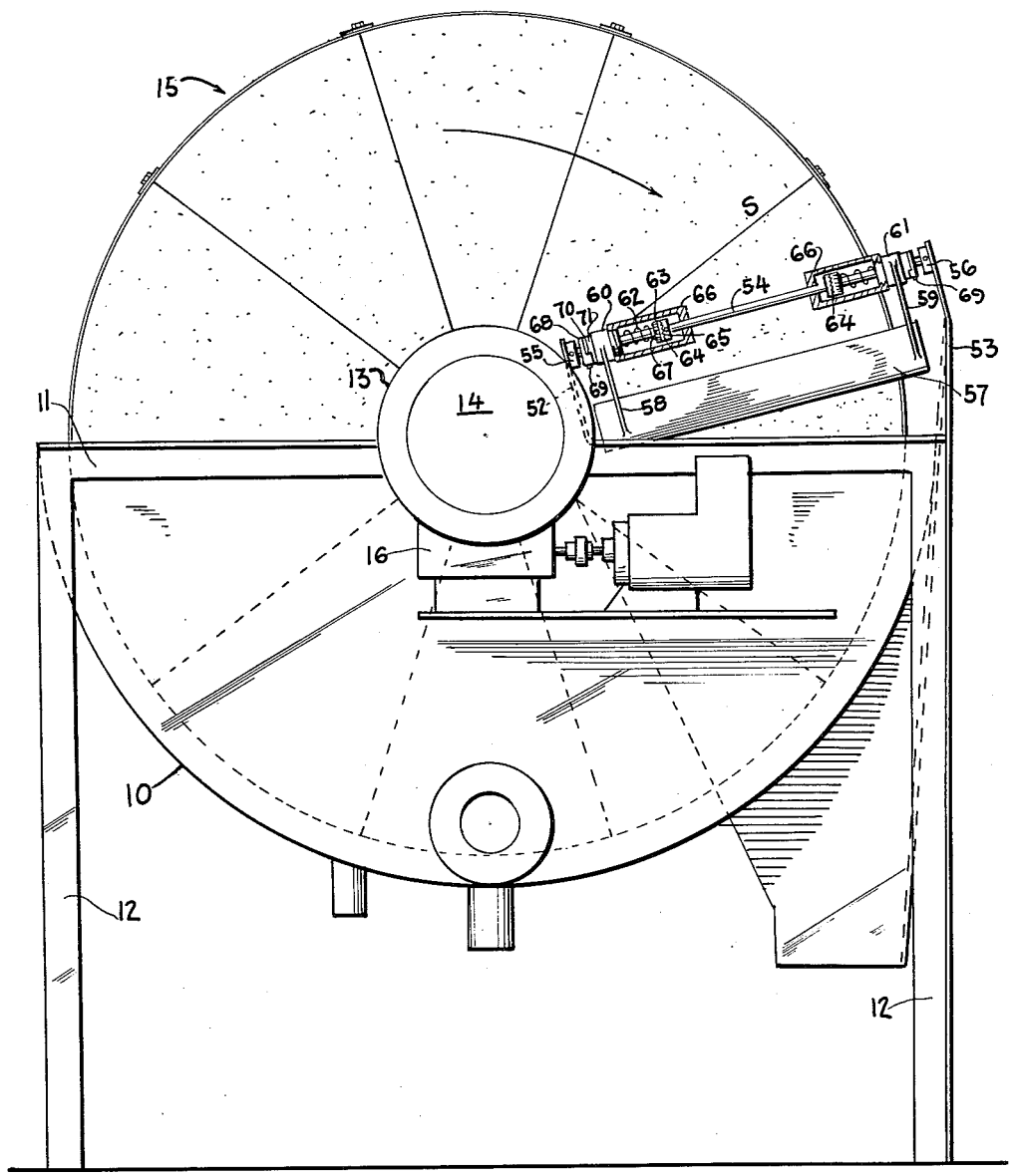
FIG. 1 is an end elevational view of a vacuum disk filter to which the principles of the invention have been applied.

Referring to the drawings, and particularly to FIGS. 1 and 2, the principles of the invention are shown as applied to a vacuum disk type filter including a substantially semi-cylindrical housing 10 which may be supported by structural steel frame members 11 and 12. The housing 10 may include bearings 13 at each end thereof for journaling a shaft 14. The shaft 14 may support a plurality of filter disks 15, and it may be driven from any suitable prime mover through a gear box 16 and a worm and gear drive 17.

The shaft 14 may have fixed to it a plurality of axially extending, circumferentially disposed, vacuum-tight compartments 18 (FIGS. 3, 3A). These compartments together with the tubular shaft 14 form a fabricated manifold M of polygonal cross section for supporting the filter disks, as will appear hereinafter. Each outermost surface of the compartments 18 may have fixed thereto a supporting block 19 having a rigid abutting surface 20. The surfaces 20 of the blocks 19 preferably are substantially planar and are parallel to the outer compartment surfaces on which they are mounted and, therefore, retain the polygonal cross section of the manifold construction.

A radially extending opening 21 extends through each block and is in communication with the interior of the compartment with which it is associated. There may be any desired number of sets of said blocks 19 in spaced intervals along the manifold M, and in the embodiment disclosed, only two such sets are shown.

Referring to FIGS. 3, 4 and 5, a framework 22 may be of sector form and may include side wall members 23 joined by inner and outer end members 24 and 25. The inner frame member 24 may be substantially planar and may have fixed to it an inlet pipe 26 that is adapted to be removably applied to a hole 21 of a block 19 in a manner such that the inner frame member 24 positively abuts against the surface 20 of the block 19 for a purpose to be described later. An O-ring 27 forms a removable sealing means between the pipe 26 and block 19.

Roll-lanced plate members 28 and 29 are cut to fit the area confined within the frame members 23, 24 and 25, and are arranged so that radial corrugations 30 are formed along the sides of the frame member, which members, as shown in FIG. 6, have free passages 31 extending therethrough.

The perforated plate members 28 and 29 may be rigidly fixed to the frame members 23, 24 and 25 forming a sector-shaped filter compartment 32. There may be such a sector-shaped compartment 32 mounted on each of the blocks 19 in a manner such that each inner member 24 of each compartment 32 seats firmly on the surface 20 of its corresponding block 19.

Referring again to FIG. 5, each adjacent frame member 23 may be provided with a radial groove 33 for the reception of a radially extending tie rod 34 that may have a nut 35 (FIG. 3) at its outer end bearing against a tie plate 36 that overlaps two adjacent compartments 32. From the foregoing it is evident that the individual sector-shaped compartments may be clamped between the surfaces 20 of blocks 19 and the plates 36 by the nuts 35 on tie rods 34 to form an extremely rigid disk construction that may be easily disassembled to replace a defective compartment 32 or for cleaning.

In the form shown, open ended, truncated conical-shaped cloth envelopes 37 may encase the compartments 32 prior to the assembly of said compartments to form a filtering disk. Referring to FIG. 6, the arcuate frame members 25 as well as the inner frame members 24 may be provided with peripheral caulking grooves 38 within which the open end edges 39 of the open ended envelope 37 may be securely caulked. This provides a means for readily eliminating any stretch that might develop in the cloth envelope during use of the filter.

Referring now to FIG. 3A, the manifold M may have fixed to its one end a face plate 40 having a separate outlet 41 in communication with each compartment 18 of the manifold. A valve 42 may comprise a ring 43 surrounding plate 40 and it may be resiliently and peripherally clamped by springs 43' and bolts 43'' to a stationary, independently mounted valve body 44 to which conduits 45 and 46 are secured. A wear plate 47 may be located between the body 44 and face plate 40. The resilient peripheral clamping of the body 44 to the plate 40 provides resilient valve seating, even wear during use and easy adjustment of the seating pressure. Also, by use of the described arrangement, less pressure is needed to insure a tight joint and even pressure distribution avoids uneven wear.

Referring to FIG. 2, narrow compartments 48 are provided in the housing 10 for the reception of each filtering disk, between which compartments a space is provided that leads to a discharge boot 49 through which the filter cake is discharged, as will appear hereinafter.

The housing 10 may be provided with an inlet 50 for introducing the slurry to be filtered. An overflow 51 may be provided in housing 10 to limit the depth of slurry to cover about forty percent maximum of the filter disk area.

Referring to FIG. 3A, a vacuum may be drawn through conduit 46 so that as each compartment 32 passes through the slurry, a vacuum will be drawn through the compartment 32, the compartment 18 to which it is attached, and out through conduit 46. This draws the filtrate out of conduit 46 and deposits filter cake on the cloth envelopes 37.

Removal of the cake from envelopes 37 may be effected by a scraper S shown in FIGS. 1 and 2. There may be provided a scraper S on each side of each filter disk, and since they are identical, only one will be specifically described.

Supporting brackets 52 and 53 may be fixed to the frame supporting the housing 10. A non-rotatable shaft 54 may extend between brackets 52 and 53 and may be fixed to bosses 55 and 56 that are integral with brackets 52 and 53.

A scraper blade 57 may be provided with arms 58 and 59 having bearings 60 and 61 that are journaled on non-rotatable shaft 54. A torsion spring 62 surrounding shaft 54 may have its one end fixed to the bearing 60 and its other end fixed to a rotatable element 63 rotatably mounted on shaft 54. Ratchet teeth 64 may be provided between element 63 and a collar 65 fixed to shaft 54. A housing 66 covers the above described mechanism. The construction is such that applying a tool to the knurled or fluted periphery 67 of element 63 and turning it will provide a torsional force tending to force the scraper blade 57 toward the surface of the compartments 32 to effect the removal of filter cake therefrom.

In order to limit the extent of movement of blade 57 toward the outer surface of compartment 32, a collar 68 may be adjustably locked to shaft 54 by a set screw 69. Stepped abutting surfaces 70 may be provided between the collar 68 and a collar 71 integral with the bearing 60 of arm 58. The scraper is pivotally suspended so that the arcuate movement of the edge relative to the adjacent disk surface is away from, and in the direction of movement of said surface when it encounters any substance that overcomes the spring pressure maintaining it against the adjustable limiting abutment surfaces 70.

In order to facilitate the removal of cake from segmental compartments 32 as they rotate past the scrapers S, a slight positive air pressure may be supplied through conduit 45 which will be distributed to each compartment 18 as the corresponding opening 41 in face plate 40 passes the conduit 45 during rotation of the filter disk.

As the cake is scraped from the compartments 32, it gravitates downwardly between the compartments 48 (FIG. 2) through the discharge boot 49.

Although the various features of the new and improved construction of a disk filter have been shown and described in detail to fully disclose one embodiment of the invention, it will be evident that numerous changes may be made in such details and certain features may be used without others without departing from the principles of the invention.

What is claimed is:

1. In a disk filter, a housing having end walls, bearing members positioned in said end walls, a manifold extending into said housing and rotatably supported by said bearing members, filter disk means mounted on said manifold for rotation therewith in said housing, stationary shaft means mounted parallel to a filtering surface of said disk means and spaced therefrom, a scraper having bearings for rotatably suspending said scraper from said stationary shaft, said scraper having a scraper edge extending parallel to and facing against the filtering surface of said filter disk means downstream from said shaft in the direction of rotation of said filter disk means, and means resiliently urging said scraper edge toward said filtering surface, whereby excessive cake buildup on said disk means that contacts the scraper edge will move the scraper edge in opposition to said urging means away from said disk means and in the direction of movement of an adjacent filtering disk surface.

2. The structure in accordance with claim 1 wherein said resiliently urging means is adjustable, and wherein adjustable stop means is provided on said stationary shaft for limiting motion of said scraper edge toward said filtering surface.

References Cited in the file of this patent

UNITED STATES PATENTS

| | | |
|---|---|---|
| 1,259,139 | Salisbury | Mar. 12, 1918 |
| 1,878,998 | Akins | Sept. 27, 1932 |
| 2,120,455 | Barnble | June 14, 1938 |
| 2,338,549 | Shriver et al. | Jan. 4, 1944 |
| 2,395,225 | Kurz | Feb. 19, 1946 |
| 2,696,916 | Peterson et al. | Dec. 14, 1954 |
| 2,885,083 | Peterson et al. | May 5, 1959 |
| 2,974,802 | Morehouse et al. | Mar. 14, 1961 |

FOREIGN PATENTS

| | | |
|---|---|---|
| 6,753 | Great Britain | May 5, 1888 |